United States Patent
Suzuki et al.

(10) Patent No.: US 8,277,250 B2
(45) Date of Patent: *Oct. 2, 2012

(54) WIRE HARNESS AND METHOD OF MANUFACTURING THE SAME

(75) Inventors: Sachio Suzuki, Hitachi (JP); Hideaki Takehara, Hitachi (JP); Kunihiro Fukuda, Tsukuba (JP); Yuta Kataoka, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 80 days.

This patent is subject to a terminal disclaimer.

(21) Appl. No.: 12/923,531

(22) Filed: Sep. 27, 2010

(65) Prior Publication Data

US 2011/0159728 A1 Jun. 30, 2011

(30) Foreign Application Priority Data

Dec. 24, 2009 (JP) .................................. 2009-293345

(51) Int. Cl.
*H01R 13/58* (2006.01)
(52) U.S. Cl. ........................................ 439/604; 439/936
(58) Field of Classification Search .................. 439/604, 439/460, 936; 174/72 R, 72 A
See application file for complete search history.

(56) References Cited

U.S. PATENT DOCUMENTS

| 6,250,972 B1 | 6/2001 | Shinchi et al. |
| 7,390,217 B2 * | 6/2008 | Scott ............................. 439/604 |
| 2001/0003688 A1 * | 6/2001 | Kondo .......................... 439/604 |

FOREIGN PATENT DOCUMENTS

| JP | 11-066807 | 3/1999 |
| JP | 2000-048901 | 2/2000 |

* cited by examiner

*Primary Examiner* — Khiem Nguyen
(74) *Attorney, Agent, or Firm* — McGinn IP Law Group, PLLC

(57) ABSTRACT

A wire harness includes a plurality of cables arranged in parallel, and a connector including a housing to which end portions of the plurality of cables are connected. Air-tightness between an air-tight block and the cables is maintained by inserting a melting member into cable insertion holes through a first insertion part, vibrating the melting member and pressing the melting member against a first press receiving part formed at an inner wall surface of the cable insertion holes such that a front end portion of the melting member in contact with the first press receiving part is melted into a melt resin to allow the melt resin to be poured into a gap between the cables and the air-tight block and a periphery of the cables to be covered with the melt resin.

11 Claims, 6 Drawing Sheets

2a-2c CABLE
35 AIR-TIGHT BLOCK
37 MELTING MEMBER
39 FIRST INSERTION PART
40 FIRST PRESS RECEIVING PART 2a-2c CABLE
35 AIR-TIGHT BLOCK
36 GAP
37 MELTING MEMBER
38 SANDWICHING PART

- 2a-2c CABLE
- 35 AIR-TIGHT BLOCK
- 37 MELTING MEMBER
- 81 SECOND INSERTION PART
- 82 SECOND PRESS RECEIVING PART

WIRE HARNESS AND METHOD OF MANUFACTURING THE SAME

The present application is based on Japanese patent application No. 2009-293345 filed on Dec. 24, 2009, the entire contents of which are incorporated herein by reference.

BACKGROUND OF THE INVENTION

1. Field of the Invention

This invention relates to a wire harness that is capable of sufficiently maintaining air-tightness between a housing of a connector and a cable and a method of manufacturing the wire harness.

2. Description of the Related Art

Generally, in a wire harness used for vehicles etc., a water proof structure is installed between the housing of the connector and the cable in order to prevent water or the like from entering into the inside of the connector so as to cause a problem.

A conventional wire harness 111 shown in FIGS. 11A and 11B uses a wire seal 114 as the air-tightness maintaining structure.

The wire harness 111 is configured to maintain the air-tightness between the outer housing 113 of the connector 116 and the cable 112 by that a wire seal 114 formed of rubber for waterproofing is inserted between the outer housing 113 of the connector 116 and the cable 112, the wire seal 114 is crushed between the outer housing 113 and the cable 112 so that it is brought into close contact with both of the outer housing 113 and the cable 112.

In the outer housing 113, a cable insertion hole 117 into which an end portion of the cable 112 is inserted is formed, and the wire seal 114 is housed in a wire seal housing concave portion 118 formed in an insertion side of the cable insertion hole 117 of the outer housing 113. An opening part of the wire seal housing concave portion 118 is blocked with a tail plate 115 in order to prevent the wire seal 114 from dropping out.

However, in case of using the wire seal 114 for the air-tightness maintaining structure between the outer housing 113 and the cable 112, it is necessary to install the wire seal 114 corresponding to each of the cables 112 and house each of the wire seals 114 in the wire seal housing concave portion 118, so that in designing, a distance between the cables is broadened and it becomes difficult to shorten a pitch of the cable 112. In particular, the wire harness for vehicles is required to be downsized, so that there is a need for an air-tightness maintaining structure that is capable of further shortening the pitch of the cable 112.

Then, as shown in FIG. 12A, a wire harness 121 is proposed, that is configured to maintain the air-tightness between the outer housing 123 and the cable 122 by that the cable 122 is sandwiched between the outer housing 123 formed of a resin and a welding member 124 formed of a resin, the welding member 124 is welded to the outer housing 123 due to ultrasonic welding by using a horn 125 (for example, refer to JP-A-2000-48901).

As show in FIG. 12B, the wire harness 121 has a structure obtained by a method that grooves 123a are formed in the outer housing 123 and grooves 124a are formed in the welding member 124 respectively, cables 122 are disposed in the grooves 123a of the outer housing 123 and simultaneously the welding member 124 is stacked from above so as to locate the grooves 124a within positions of the cables 122, and in this condition, the horn 125 is brought into contact with an upper surface of the welding member 124 and is pressed from above down below while the welding member 124 is vibrated, and the welding member 124 is welded to the outer housing 123 due to the ultrasonic welding.

This technique is disclosed in, for example, JP-A-2000-48901 and JP-A-11-66807.

SUMMARY OF THE INVENTION

However, the above-mentioned wire harness 121 has a problem described below.

In the technique about the ultrasonic welding a disclosed in JP-A-2000-48901, a sheath 122a of a surface part of the cable 122 is also melted, but in this case, it is necessary to study a thickness and a quality of material of the sheath 122a on the assumption that the sheath 122a is melted due to the ultrasonic welding when the sheath 122a of the cable 122 is designed and selected, so that it becomes a restriction at the time of designing a wire harness. In particular, with regard to a thickness of the sheath 122a, it is necessary that the sheath 122a is designed to have a thickness thicker than usual on the assumption that the sheath 122a is melted due to the ultrasonic welding.

Therefore, it is an object of the invention to provide a wire harness that is capable of sufficiently maintaining air-tightness between a housing of a connector and a cable without melting a sheath of the cable as much as possible and a method of manufacturing the wire harness.

(1) According to one embodiment of the invention, a wire harness comprises:

a plurality of cables arranged in parallel; and a connector comprising a housing to which end portions of the plurality of cables are connected, wherein the housing comprises an air-tight block at a side thereof that the plurality of cables are connected, the air-tight block comprising a plurality of cable insertion holes formed in parallel through which the plurality of cables are inserted into the housing, wherein the cable insertion holes are formed to have a gap with a predetermined distance between the cables and the air-tight block, two adjacent ones of the cable insertion holes being formed to overlap with each other and to communicate with each other, wherein the air-tight block further comprises a first insertion part into which a melting member formed of a resin is inserted and which allows the melting member to be inserted into a part that two adjacent ones of the cable insertion holes communicate with each other without pressing the cables, and a first press receiving part formed at an inner wall surface of the cable insertion holes opposite the first insertion part, for allowing a front end of the melting member inserted into the cable insertion holes through the first insertion part to be pressed against the first press receiving part, and wherein air-tightness between the air-tight block and the cables is maintained by inserting the melting member into the cable insertion holes through the first insertion part, vibrating the melting member and pressing the melting member against the first press receiving part such that the front end portion of the melting member in contact with the first press receiving part is melted into a melt resin to allow the melt resin to be poured into the gap and a periphery of the cables to be covered with the melt resin.

In the above embodiment (1) of the invention, the following modifications and changes can be made.

(i) The air-tight block further comprises a second insertion part into which the melting member is inserted, and which communicates with two at both ends of the plurality of cable insertion holes arranged in parallel, and a second press receiving part formed at an inner wall surface of the second insertion part, for pressing a forward end of the melting member inserted into the second insertion part, and wherein a forward end portion of the melting member in contact with the second press receiving part is melted into a melt resin by inserting the melting member into the second insertion part, vibrating the melting member and pressing the melting member against the second press receiving part such that the melt resin is poured into the gap.

(2) According to another embodiment of the invention, a wire harness comprises:

a plurality of cables arranged in parallel; and a connector comprising a housing to which end portions of the plurality of cables are connected, wherein the housing comprises an air-tight block at a side thereof that the plurality of cables are connected, the air-tight block comprising a plurality of cable insertion holes formed in parallel through which the plurality of cables are inserted into the housing, wherein the cable insertion holes are formed to have a gap with a predetermined distance between the cables and the air-tight block, two adjacent ones of the cable insertion holes being formed to overlap with each other and to communicate with each other, wherein the air-tight block further comprises a second insertion part into which a melting member formed of a resin is inserted and which communicates with two at both ends of the cable insertion holes arranged in parallel, and a second press receiving part formed at an inner wall surface of the second insertion part, for allowing a front end of the melting member inserted into the second insertion part to be pressed against the second press receiving part, and wherein air-tightness between the air-tight block and the cables is maintained by inserting the melting member into the first insertion part, vibrating the melting member and pressing the melting member against the second press receiving part such that the front end portion of the melting member in contact with the second press receiving part is melted into a melt resin to allow the melt resin to be poured into the gap and a periphery of the cables to be covered with the melt resin.

In the above embodiment (2) of the invention, the following modifications and changes can be made.

(ii) The air-tight block is formed of a resin, and the melting member has a melting temperature (=melting point) lower than the air-tight block.

(iii) The air-tight block is formed of a resin, the melting member and the air-tight block are formed of a material equal to each other or materials of which melting temperatures are close to each other, and a metal member or a high melting point member formed of a resin of which a melting temperature is higher than the melting member is installed in the press receiving parts against which the melting member is pressed.

(iv) The air-tight block further comprises a sandwiching part for sandwiching the cables so as to keep the gap formed on the periphery of the cables to have a predetermined distance.

(v) The two sandwiching parts are formed in a longitudinal direction of the cables and the melt resin is poured into the gap between the two sandwiching parts, and after the gap between both of the sandwiching parts is perfectly filled with the melt resin, the melting member is further pressed and melted such that the cables are pressed by the melt resin pouring into the gap between the two sandwiching parts.

(vi) The air-tight block is formed of a pair of division air-tight blocks that is formed of a resin, and is divided into two pieces so as to vertically sandwich the plurality of cables arranged in parallel, and on the condition that the plurality of cables are sandwiched between the pair of division air-tight blocks, the pair of division air-tight blocks is welded by ultrasonic welding so as to be integrated.

(vii) A plurality of the insertion parts and a plurality of the press receiving parts are formed in a longitudinal direction of the cables and the melting member is inserted into the plurality of insertion parts, respectively, and a plurality of the melting members inserted into the plurality of insertion parts are pressed simultaneously.

(3) According to another embodiment of the invention, a method of manufacturing a wire harness comprising a plurality of cables arranged in parallel and a connector comprising a housing to which end portions of the plurality of cables are connected, wherein the housing comprises an air-tight block at a side thereof that the plurality of cables are connected, the air-tight block comprising a plurality of cable insertion holes formed in parallel through which the plurality of cables are inserted into the housing, wherein the cable insertion holes are formed to have a gap with a predetermined distance between the cables and the air-tight block, two adjacent ones of the cable insertion holes being formed to overlap with each other and to communicate with each other, and wherein the air-tight block further comprises a first insertion part into which a melting member formed of a resin is inserted and which allows the melting member to be inserted into a part that two adjacent ones of the cable insertion holes communicate with each other without pressing the cables, and a first press receiving part formed at an inner wall surface of the cable insertion holes opposite the first insertion part, for allowing a front end of the melting member inserted into the cable insertion holes through the first insertion part to be pressed against the first press receiving part, the method comprises:

inserting the melting member into the cable insertion holes through the first insertion part; and vibrating the melting member and pressing the melting member against the first press receiving part such that the front end portion of the melting member in contact with the first press receiving part is melted into a melt resin to allow the melt resin to be poured into the gap and a periphery of the cables to be covered with the melt resin in order to maintain air-tightness between the air-tight block and the cables.

(4) According to another embodiment of the invention, a method of manufacturing a wire harness comprising a plurality of cables arranged in parallel and a connector comprising a housing to which end portions of the plurality of cables are connected, wherein the housing comprises an air-tight block at a side thereof that the plurality of cables are connected, the air-tight block comprising a plurality of cable insertion holes formed in parallel through which the plurality of cables are inserted into the housing, wherein the cable insertion holes are formed to have a gap with a predetermined distance between the cables and the air-tight block, two adjacent ones of the cable insertion holes being formed to overlap with each other and to communicate with each other, and wherein the air-tight block further comprises a second insertion part into which a melting member formed of a resin is inserted and which communicates with two at both ends of the cable insertion holes arranged in parallel, and a second press receiving part formed at an inner wall surface of the second insertion part, for allowing a front end of the melting member inserted into the second insertion part to be pressed against the second press receiving part, the method comprises:

inserting the melting member into the first insertion part; and vibrating the melting member and pressing the melting member against the second press receiving part such that the front end portion of the melting member in contact with the second press receiving part is melted into a melt resin to allow the melt resin to be poured into the gap and a periphery of the cables to be covered with the melt resin in order to maintain air-tightness between the air-tight block and the cables.

POINTS OF THE INVENTION

According to one embodiment of the invention, a wire harness is constructed such that a melting member is inserted into a cable insertion hole via a first insertion part and is vibrated and simultaneously pressed to the first press receiving part so that a forward end portion of the melting member in contact with the first press receiving part is melted into a melt resin, and the melt resin is poured into a gap between cables and an air-tight block and the periphery of the cables are covered with the melted resin. Thus, the air-tightness between the air-tight block and the cables can be maintained. In addition, the melting member is inserted into a part where the adjacent cable insertion holes communicate with each other through the first insertion part without pressing the cables. Thereby, the air-tightness between the air-tight block and the cables can be maintained without melting a sheath of the cables.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 1:
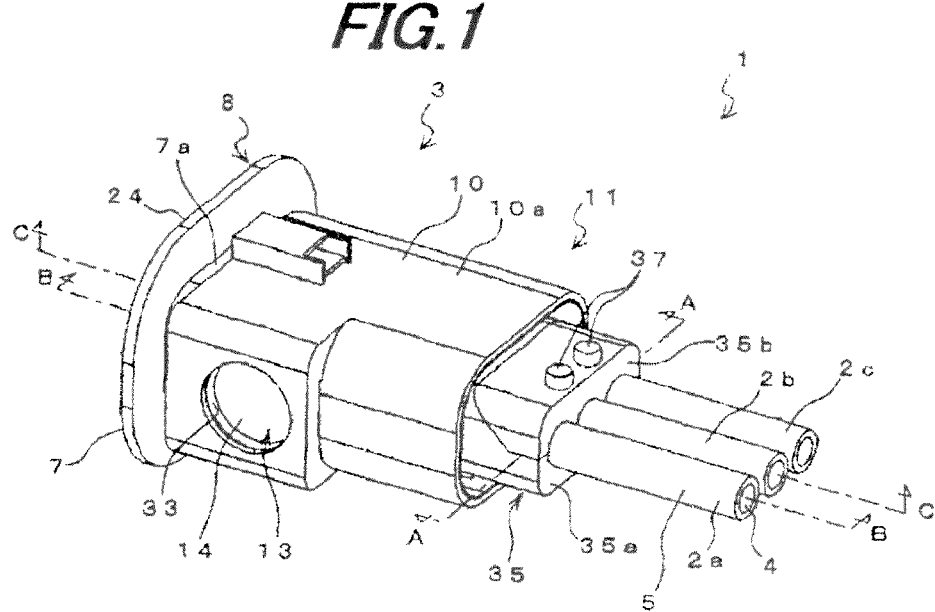
FIG. 1 is a perspective view schematically showing a wire harness according to one embodiment of the invention.

The preferred embodiments according to the invention will be explained below referring to the drawings.

Figure 2:
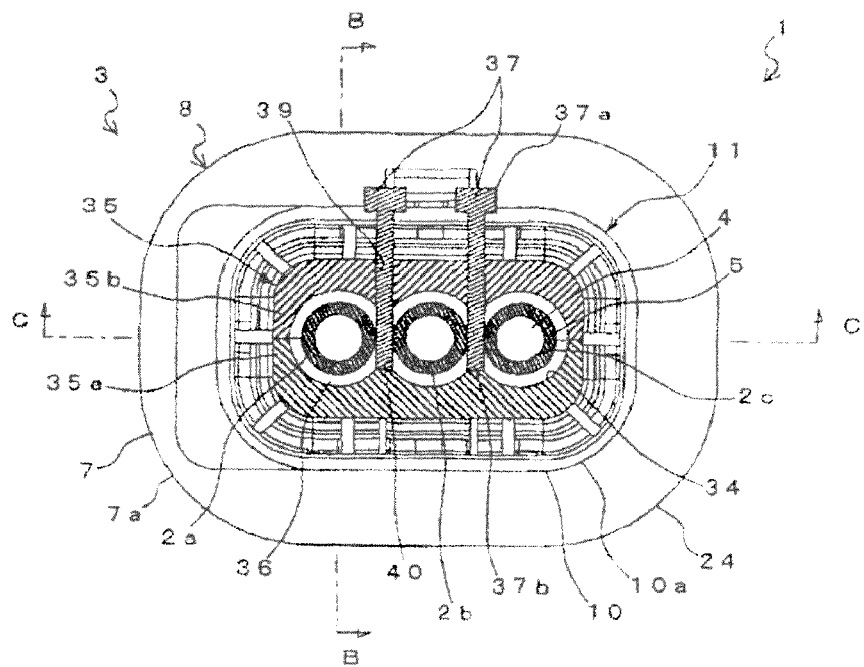
FIG. 2 is a cross-sectional view taken along the line A-A in FIG. 1.
Figure 3:
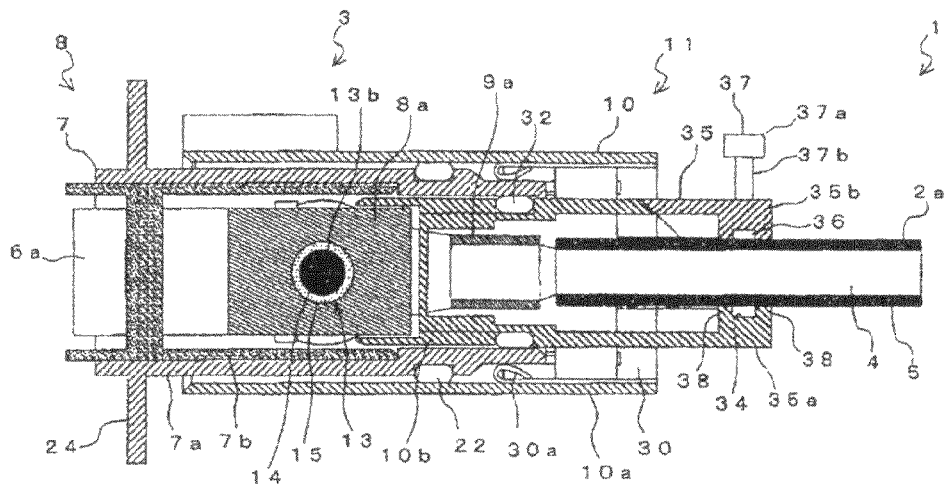
FIG. 3 is a cross-sectional view taken along the line B-B in FIG. 1.
Figure 4:
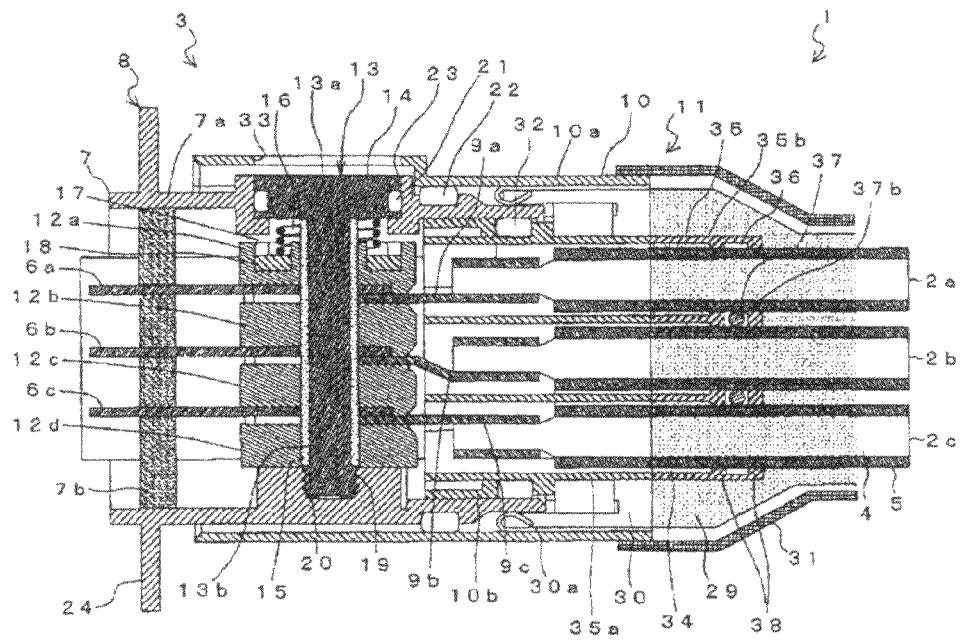
FIG. 4 is a cross-sectional view taken along the line C-C in FIG. 1.

FIG. 1 is a perspective view schematically showing a wire harness according to one embodiment of the invention, FIG. 2 is a cross-sectional view taken along the line A-A in FIG. 1, FIG. 3 is a cross-sectional view taken along the line B-B in FIG. 1 and FIG. 4 is a cross-sectional view taken along the line C-C in FIG. 1. Further, the detail will be explained later, but FIG. 1 shows a situation after a melting member 37 is melted and FIGS. 2 to 4 show a situation before the melting member 37 is melted.

As shown in FIGS. 1 to 4, a wire harness 1 includes a plurality of cables 2a to 2c arranged in parallel and a connector 3 to which end portions of the cables 2a to 2c are connected.

The wire harness 1 is used for, for example, a connection between a motor of a hybrid electric vehicle (HEV) and an inverter that drives the motor.

The cables 2a to 2c include a central conductor 4 formed of copper or aluminum, and a sheath 5 formed on a periphery of the central conductor 4. The cables 2a to 2c can be also configured to include an insulator, a shield conductor and the sheath 5 that are formed on the periphery of the central conductor 4 in this order. Electricity of different voltage and/or current is transmitted to each of the cables 2a to 2c. For example, in the embodiment, three cables 2a to 2c are used on the assumption of a power-supply line of three-phase alternating current for connection between a motor and an inverter, and alternating currents that have a different phase by 120 degrees with each other are transmitted to each of the three cables 2a to 2c.

The connector 3 includes a first connector part 8 having a first housing 7 in which a plurality (three) of first bonding terminals 6a to 6c are housed in alignment with each other, and a second connector part 11 having a second housing 10 in which a plurality (three) of second bonding terminals 9a to 9c are housed in alignment Further, in the embodiment, both of the housings 7, 10 are formed to have a structure that the first housing 7 is male and the second housing 10 is female when both of the connector parts 8, 11 are fitted into each other, but the male-female relation can be reversed, and a structure that the first housing 7 is female and the second housing 10 is male can be also adopted.

In the embodiment, a case that the first connector part 8 is connected to a side of a device such as a motor, an inverter, and the second connector part 11 is connected to a side of cables 2a to 2c, and the device such as a motor, an inverter and the cables 2a to 2c are connected to each other at the connector 3 will be explained. Namely, in the embodiment, an air-tightness maintaining structure between the cables 2a to 2c and the housing (the second housing 10) is installed in the second connector part 11.

Here, prior to an explanation of the air-tightness maintaining structure in the embodiment, the connector 3 will be explained. Further, a structure of the connector 3 explained here is a just example, the invention does not limited to this.

In the embodiment, as the connector 3, a connector is used, that has a structure that when first connector part 8 and second connector part 11 are fitted into each other, each of one surfaces of the plurality of first connecting terminals 6a to 6c and each of one surfaces of the plurality of second connecting terminals 9a to 9c face each other so that they form a pair with each other, and simultaneously the plurality of the first connecting terminals 6a to 6c and the plurality of the second connecting terminals 9a to 9c are alternately arranged so that a stacked state is formed. It is a so-called stack structure type connector.

First, the first connector part 8 will be explained.

The first connector part 8 includes the first housing 7 in which three first bonding terminals 6a to 6c are housed in alignment with each other, a plurality of insulation members 12a to 12d having a nearly rectangular parallelepiped shape, for insulating each of the first connecting terminals 6a to 6c housed in the first housing 7, and a connection member 13 that has a head part 13a and an shaft part 13b connected to the head part 13a, is configured to allow the shaft part 13b to pass through each of the contacts according to the plurality of first connecting terminals 6a to 6c and the plurality of second connecting terminals 9a to 9c, and the plurality of insulation members 12a to 12d, and simultaneously to allow the head part 13a to press the insulation member 12a adjacent to the head part 13a, so as to collectively fixes and electrically connects the plurality of first connecting terminals 6a to 6c and the plurality of second connecting terminals 9a to 9c at each of the contacts, and at least the parts passing through each of the contacts are formed of an insulating material.

The first housing 7 includes a first outer housing 7a and a first inner housing 7b for holding the first bonding terminals 6a to 6c in the first outer housing 7a.

It is preferable that the first outer housing 7a is formed of metal such as aluminum having a high electric conductivity, a high heat conductivity and a light weight in view of shield performance, radiation properties and reduction in weight of the connector 3, but it can be formed of a resin or the like. In the embodiment, the first outer housing 7a is formed of aluminum.

The first inner housing 7b is formed of an insulating resin such as polyphenylene sulfide (PPS) resin, polyphthalamide (PPA) resin, polyamide (PA) resin, and polybutylene terephthalate (PBT) resin.

The first connecting terminals 6a to 6c are such that have a plate-like shape and are formed of metal having high electric conductivity such as silver, copper, aluminum. The first connecting terminals 6a to 6c are held in the first outer housing 7a in alignment with each other and apart from each other at predetermined intervals by the first inner housing 7b. Each of the first connecting terminals 6a to 6c has a certain degree of flexibility.

Figure 5:
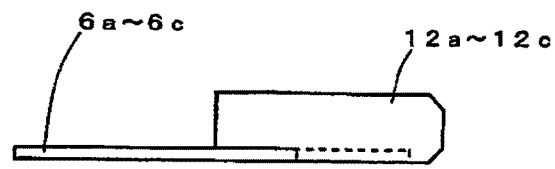
FIG. 5 is a side view schematically showing a first bonding terminal in the wire harness shown in FIG. 1.

As shown in FIG. 5, the insulation members 12a to 12c are fixed to a surface of each of the first connecting terminals 6a to 6c opposite to a surface to be bonded to the second bonding terminals 9a to 9c. In addition, the second insulation member 12d is fixed to an inner surface of the first outer housing 7a so as to face a surface opposite to a surface to be bonded to the first bonding terminal 6c of the second bonding terminal 9c that locates at the outermost position when the first bonding terminals 6a to 6c and the second bonding terminal 9a to 9c are stacked. Each of the insulation members 12a to 12d are fixed in such a position that they project to a side of the forward ends of the first bonding terminals 6a to 6c, and the insulation members 8a to 8d are chamfered at the corners located at the side into (from) which the second bonding terminals 9a to 9c are inserted (removed) in order to enhance insertion property of the second bonding terminals 9a to 9c. Further, in FIG. 5, the first insulation members 12a to 12c are shown by simplifying the structure thereof and the first insulation members 12a to 12c are shown in the same fashion.

The connection member 13 includes a bolt 14 formed of metal such as SUS, iron, copper alloy and an insulation layer 15 formed by that a periphery of the shaft part 13b is coated with an insulating resin as an insulating material such as polyphenylene sulfide (PPS) resin, polyphthalamide (PPA) resin, polyamide (PA) resin, polybutylene terephthalate (PBT) resin. Further, a concave portion not shown into which a hexagonal wrench (also referred to as an open-end wrench) is fitted.

An elastic member 16 is installed between a lower surface of the head part 13a of the connection member 13 and an upper surface of the first insulation member 12a arranged directly below the head part 13a, the elastic member 16 being used for applying a predetermined pressing force to the first insulation member 12a. Here, the elastic member 16 is formed of, for example, a spring of metal such as SUS. In an upper surface of the first insulation member 12a with which the lower portion of the elastic member 16 comes into contact, a concave portion 17 housing the lower portion of the elastic member 16 is formed, and in a bottom portion of the concave portion 17 (namely, a seat portion with which the lower portion of the elastic member 16 comes into contact), a receiving member 18 of metal such as SUS is installed, the receiving member 18 being used for receiving the elastic member 16 and preventing the first insulation member 12a f from being damaged.

The connection member 13 is inserted into the first outer housing 7a from a side of the surfaces of the first bonding terminals 6a to 6c (FIG. 4 shows as a side of the upper surfaces) to which the first insulation members 12a to 12c are fixed, and presses them from the head part 13a toward the forward end of the shaft part 13b of the connection member 13 (FIG. 4 shows as from the upper portion toward the lower portion) by that the screw part 19 located at the forward end of the shaft part 13b is screwed to a threaded screw hole 20 formed on an inner peripheral surface of the first outer housing 7a, and collectively fixes and electrically connects the first bonding terminals 6a to 6c and the second bonding terminals 96a to 9c at each of the contacts.

In a periphery of the head part 13a of the connection member 13, a packing 21 for preventing water from entering into the first outer housing 7a is installed. In addition, in a peripheral part of the first outer housing 7a, a packing 22 for coming into contact with an inner peripheral surface of the second housing 10 (the second outer housing 10a) when both of the connector parts 8, 11 are fitted into each other is installed.

In an upper part of the first outer housing 7a (FIG. 4 shows as an upper side), a connection member insertion hole 23 into which the connection member 13 is inserted is formed. The connection member insertion hole 23 is formed so as to have a tubular shape and the lower end portion (FIG. 4 shows as a lower side) of the tubular shape is folded interiorly. A peripheral edge part of a lower surface of the head part 13a of the connection member 13 comes into contact with the folded part, so that stroke of the connection member 13 can be controlled.

In an periphery of the first outer housing 7a, a flange 24 (mounting holes are not shown) for fixing the first connector part 8 to a case body such as a device, for example, a shield case of a motor or an inverter is formed. When the first connector part 8 is connected to a motor or an inverter, the flange 24 is fixed to the shield case of the motor or the inverter, and simultaneously portions of the first bonding terminals 6a to 6c exposed from the first housing 7 is connected to each terminal in a terminal block installed in the shield case of the motor or the inverter. The first connector parts 8 are connected to both of the motor and the inverter respectively and the second connector parts 11 installed in both end portions of the cable 2a to 2c are fitted into both of the first connector parts 8 respectively, so that the motor and the inverter are electrically connected to each other via the wire harness 1.

Next, the second connector part 11 will be explained.

The second connector part 11 includes a second housing 10 in which the plurality (three) of second bonding terminals (female terminal) 9a to 9c are housed in alignment with each other. The second bonding terminals 9a to 9c are electrically connected to the end portions of the cables 2a to 2c.

The second housing 10 includes the second outer housing 10a and a second inner housing 10b that has a multiple tubular shape, namely a shape that a plurality of tubes are connected to each other, has an air-tight block 35 described below, and holds the cables 2a to 2c in the second outer housing 10a so that the cables 2a to 2c are in alignment with each other and apart from each other at predetermined intervals.

It is preferable that the second outer housing 10a is formed of metal such as aluminum having a high electric conductivity, a high heat conductivity and a light weight in view of shield performance, radiation properties and reduction in weight of the connector 1, but it can be formed of a resin or the like. In the embodiment, the second outer housing 10a is formed of an insulating resin.

The second inner housing 10b (an air-tight block 35 described below is also included) is formed of an insulating resin such as polyphenylene sulfide (PPS) resin, polyphthalamide (PPA) resin, polyamide (PA) resin, and polybutylene terephthalate (PBT) resin.

The second connecting terminals 9a to 9c are formed of metal having high electric conductivity such as silver, copper, aluminum. Each of the second bonding terminals 9a to 9c is held in the second outer housing 10a in alignment with each other and apart from each other at predetermined intervals by holding the cables 2a to 2c (that are located at positions adjacent to the second bonding terminals 9a to 9c) at the second inner housing 10b. Each of the second bonding terminals 9a to 9c has a certain degree of flexibility.

Figure 6A:
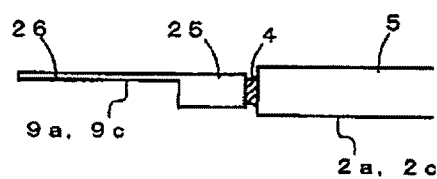
FIG. 6A is a side view schematically showing a second bonding terminal in the wire harness shown in FIG. 1.
Figure 6B:
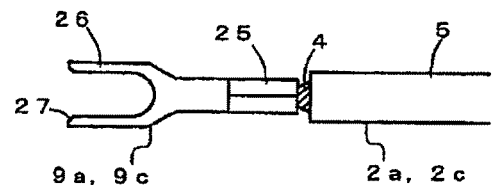
FIG. 6B is a bottom view schematically showing a second bonding terminal in the wire harness shown in FIG. 1.

As shown in FIG. 6, the second bonding terminals 9a to 9c arranged in both end portions at the time of the alignment include a swaging part 25 for swaging the conductive body 4 exposed from the forward end parts of the cables 2a, 2c, and a U-shaped contact 26 integrally formed with the swaging part 25. A tapered part 27 is formed in the forward end part of the U-shaped contact 26 for the purpose of enhancing insertion properties.

Figure 7A:
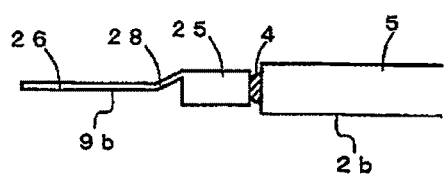
FIG. 7A is a side view schematically showing a second bonding terminal in the wire harness shown in FIG. 1.
Figure 7B:
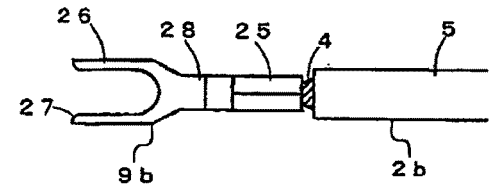
FIG. 7B is a bottom view schematically showing a second bonding terminal in the wire harness shown in FIG. 1.
Figure 8:
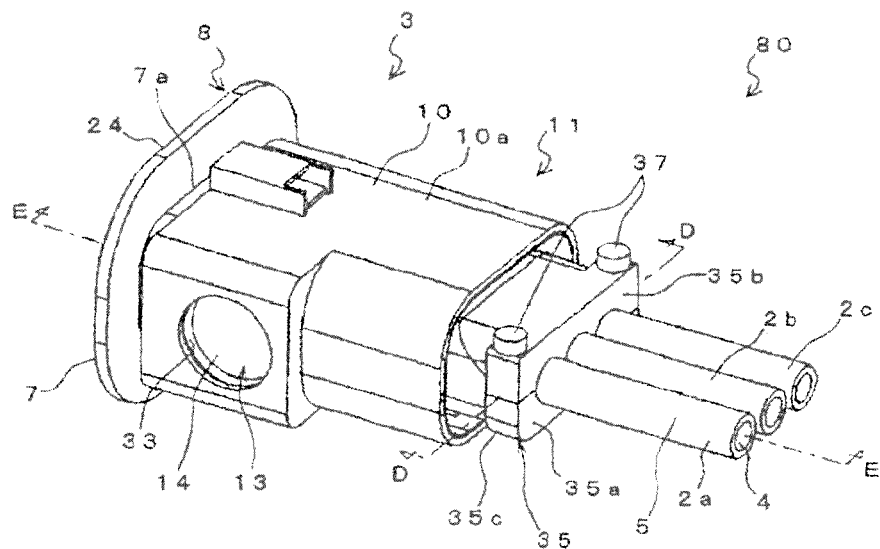
FIG. 8 is a perspective view schematically showing a wire harness according to another embodiment of the invention.

As shown in FIG. 7, the second bonding terminal 9b arranged in a central portion at the time of the alignment includes a swaging part 25 for swaging the conductive body 4 exposed from the forward end part of the cable 2b, and a U-shaped contact 26 integrally formed with the swaging part 25 similarly to the second bonding terminals 9a to 9c, but the second bonding terminal 9b is configured to be folded at a body part 28 so that the U-shaped contact 26 is located on the central axis of the cable 2b. A tapered part 27 is formed in the forward end part of the U-shaped contact 26 for the purpose of enhancing insertion properties.

When the first connector part 8 and the second connector part 11 are fitted to each other, the U-shaped contact 26 is inserted so as to sandwich the shaft part 13b of the connection member 13. In the embodiment, the second bonding terminals 9a, 9c are arranged as the U-shaped contacts 26 thereof are located in a side of the second bonding terminal 9b, and a body part 28 of the second bonding terminal 9b that is arranged in the central portion at the time of the alignment is bent, so that the second bonding terminals 9a to 9c can be arranged apart from each other at the same intervals.

A braided shield 29 for enhancing a shield performance is wrapped around the parts of the cables 2a to 2c that are pulled out of the outer side terminal housing 10a. The braided shield 29 is brought into contact with a tubular shield body 30 described below and is electrically connected (has identical potentials (GND)) to the first outer housing 7a via the tubular shield body 30.

In addition to the above, a periphery of a side of another end of the second outer housing 10a out of which the cables 2a to 2c are pulled is covered with a rubber boot 31 so as to prevent water from entering into the second outer housing 10a. Further, the braided shield 29 and the rubber boot 31 are not shown in FIGS. 1 to 3 for the purpose of simplification of the drawings.

A packing 32 that comes into contact with the inner peripheral surface of the first outer housing 7a is installed on the peripheral part of the second inner housing 10b. Namely, the connector 3 is formed so as to have a double waterproof structure that includes the packing 22 installed on the peripheral part of the first outer housing 7a and the packing 32 installed on the peripheral part of the second inner housing 10b.

In addition, a connection member operation hole 33 is formed in the second outer housing 10a, the hole 40 being used for operating the connection member 13 installed in the first connector part 8 when both of the connector parts 8, 11 are fitted to each other.

In the embodiment, since the second outer housing 10a is formed of an insulating resin, in order to enhance shield performance and radiation properties, a tubular shield body 30 formed of aluminum is installed on the inner peripheral surface in a side of another end of the second outer housing 10a. The tubular shield body 30 has a contact part 30a for coming into contact with a periphery of the first outer housing 7a formed of aluminum when both of the connector parts 8, 11 are fitted to each other, and is thermally and electrically connected to the first outer housing 7a via the contact part 30a, and due to this, shield performance and radiation properties are enhanced.

Next, the connection of the first bonding terminals 6a to 6c and the second bonding terminals 9a to 9c using the connector 3 according to the embodiment will be explained.

When both of the connector parts 8, 11 are inserted into each other, each of the second bonding terminals 9a to 9c is inserted between each of the first bonding terminals 6a to 6c that form a pair with the second bonding terminals 9a to 9c and the insulation members 12a to 12d. And, due to the insertion, each of one surfaces of the first bonding terminals 6a to 6c and each of one surfaces of the second bonding terminals 9a to 9c face so as to form a pair with each other, and simultaneously the first bonding terminals 6a to 6c, the second bonding terminals 9a to 9c and the insulation members 12a to 12d are alternately arranged so as to form a stacked state. In this state, when the connection member 13 is operated through the connection member operation hole 33 and the screw part 19 of the connection member 13 is screwed to the threaded screw hole 20 of the first outer housing 7a so as to be fastened, the connection member 13 is pushed into a bottom part of the threaded screw hole 20 while rotated, and simultaneously the first insulation member 12a, the first insulation member 12b, the first insulation member 12c and the second insulation member 12d are pressed in this order by the elastic member 16, so that each of the contacts is pressed so as to be sandwiched between any two of the insulation members 12a to 12d and each of the contacts is brought into contact with each other in an insulated state. At this time, each of the first bonding terminals 6a to 6c and each of the second bonding terminals 9a to 9c are somewhat bent due to pressing force of the insulation members 12a to 12d, so as to be brought into contact with each other in a wide range.

Next, an air-tightness maintaining structure between the second housing 10 and the cables 2a to 2c that is a characteristic feature of the present invention will be explained.

The wire harness 1 includes an air-tight block 35 formed in a side which is a part of the second housing 10, more particular, a part of the second inner housing 10b and at which the plurality of cables 2a to 2c are connected, the air-tight block 35 having a plurality of cable insertion holes 34 formed in parallel, for allowing the plurality of cables 2a to 2c to be inserted into the second housing 10.

Incidentally, air-tightness between the second inner housing 10b and the second outer housing 10a is maintained when both of the connector parts 8, 11 are fitted into each other by two packings 22, 32, and further the air-tightness is maintained also by the rubber boot 31, so that the air-tight block 35 is installed in a state of air-tightness also to the second outer housing 10a.

The cable insertion holes 34 formed in the air-tight block 35 in parallel is formed to have a diameter larger than the cables 2a to 2c, and is formed to have a gap 36 with a predetermined distance between the cables 2a to 2c and the air-tight block 35. The gap 36 is a space into which a melted resin obtained when a melting member 37 described below is melted is poured, and the gap part 36 is formed to have a width being wide to such an extent that the melted resin can be positively poured. In addition, the cable insertion holes 34 are formed to be communicated with each other so that the cable insertion holes 34 adjacent to each other are stacked on each other. Namely, in the embodiment, the gaps 36 formed around the cables 2a to 2c adjacent to each other are communicated with each other.

The air-tight block 35 has a sandwiching part 38 for sandwiching the cables 2a to 2c so as to keep a distance between the cables 2a to 2c and the air-tight block 35 to be constant and to keep the gap 36 formed around the cables 2a to 2c to have a predetermined distance. The sandwiching part 38 is formed by that a part of the cable insertion hole 34 is reduced in diameter to almost the same diameter as the diameter of the cables 2a to 2c (a diameter slightly larger than the diameter of the cables 2a to 2c). In the embodiment, two sandwiching parts 38 are formed in a rear end portion of the air-tight block 35 in a longitudinal direction of the cables 2a to 2c and the melted resin is poured into the gap 36 between the both sandwiching parts 38.

In addition, at least in the sandwiching parts 38, the air-tight block 35 is formed to be divided into two pieces so as to be vertically (refer to FIGS. 1 and 3) sandwich the cables 2a to 2c arranged in parallel. This is a countermeasure against that it becomes difficult to insert the cables 2a to 2c into the air-tight block 35 (the cable insertion hole 34) due to the formation of the sandwiching parts 38. In the embodiment, in order to divide the two sandwiching parts 38, a part of the rear end portion of the air-tight block 35 (FIG. 3 shows as an upper right side) is divided, so as to be separately formed. Of the divided air-tight blocks 35, a part fixed to a side of the second outer housing 10a is referred to as a first division air-tight block 35a and a part that is divided from the first division air-tight block 35a so as to be separately formed is referred to as a second division air-tight block 35b. Prior to a process of melting the melting member 37, a pair of the division air-tight blocks 35a, 35b is melted due to the ultrasonic welding so as to be integrated with each other in a state that the cables 2a to 2c are sandwiched between a pair of the division air-tight blocks 35a, 35b.

In the air-tight block 35, a first insertion part 39 is formed, that is a part into which the melting member 37 formed of a resin is inserted, for allowing the melting member 37 to be inserted into a communication part in which the cable insertion holes 34 adjacent to each other are communicated with each other so as not to press the cables 2a to 2c. The first insertion part 39 is formed of a hole that passes through the second division air-tight block 35b in a perpendicular direction (FIG. 2 shows as a vertical direction) to a longitudinal direction of the cables 2a to 2c.

In the embodiment, since three cables 2a to 2c are arranged in parallel, a total of two first insertion parts 39 are formed, of which one is formed between the cable 2a and the cable 2b and another is formed between the cable 2b and the cable 2c, but is not limited to this, the number of the first insertion part 39 can be one or not less than three. In addition, in the embodiment, the two first insertion parts 39 are formed in the same position in a longitudinal direction of the cables 2a to 2c, but is not limited to this, the first insertion parts 39 can be formed in different positions in the longitudinal direction of the cables 2a to 2c, and for example, a plurality of the first insertion parts 39 can be formed between the cable 2a and the cable 2b in the longitudinal direction. In the embodiment, since the melted resin is poured into the gap 36 between the two sandwiching parts 38, the first insertion parts 39 are formed to be located between both sandwiching parts 38.

In addition, in the air-tight block 35, a first press receiving part 40 is formed in an inner wall surface of the cable insertion hole 34 opposite to the first insertion part 39, for allowing a forward end of the melting member 37 inserted into the cable insertion hole 34 via the first insertion part 39 to be pressed. The first press receiving part 40 is formed of a flat surface formed perpendicularly to the insertion direction (FIG. 2 shows as a vertical direction) of the melting member 37 inserted via the first insertion part 39. In the embodiment, since two first insertion parts 39 are formed, two first press receiving parts 40 are formed corresponding to both first insertion parts 39. The two first press receiving parts 40 are formed in the same position in the insertion direction of the melting member 37.

The melting member 37 is formed to have a pin shape including a shaft part 37b of a columnar shape inserted into the first insertion part 39 and a head part 37a of a flange shape formed in a rear end portion of the shaft part 37b.

The melting member 37 is configured to have a composition that a forward end portion of the shaft part 37b is inserted into the first insertion part 39, and in a state that a horn (not shown) is brought into contact with the head part 37a, the forward end portion of the shaft part 37b is vibrated by the horn and simultaneously is pressed to the first press receiving part 40, so that the forward end portion of the shaft part 37b is melted. At this time, in order to prevent the first press receiving part 40 (namely the air-tight block 35) from being melted, as the melting member 37, a resin is used, that has a melting temperature (=melting point) lower than the air-tight block 35. The resin used for the melting member 37 includes, for example, polyphenylene sulfide (PPS) resin, polyphthalamide (PPA) resin, polyamide (PA) resin, polybutylene terephthalate (PBT) resin.

Since the head part 37a of the melting member 37 becomes a part with which the horn is brought into contact when the melting member 37 is melted, in order to prevent the head part 37a from being melted due to heat generation between the horn and the head part 37a when the melting member 37 is melted, the head part 37a is formed to have a largeness (area) sufficient to ensure a contact area with the horn.

The shaft parts 37b of the melting member 37 are formed to have a diameter equal to or less than a distance between the cables 2a to 2c adjacent to each other. In the embodiment, the shaft parts 37b each have a diameter equal to or less than the distance between adjacent two of the cables 2a to 2c. Due to this, when the melting member 37 is inserted into the first insertion part 39, the shaft parts 37b are brought into contact with the cables 2a to 2c (sheath 5), but the insertion direction of the melting member 37 is perpendicular to the parallel arrangement direction, so that the sheath 5 is prevented from being pressed and the sheath 5 is also prevented from being melted due to the heat generation between the shaft parts 37b and the sheath 5.

The shaft parts 37b of the melting member 37 is set to have such a length that an amount of the melted resin to be melted becomes such an extent that the gap 36 is perfectly filled with the melted resin or the amount becomes somewhat larger than the extent. In addition, in the embodiment, two first insertion parts 39 and two first press receiving part 40 are formed, and two melting member 37 are used, and the two melting member 37 are formed to have almost the same length. The reason why this composition is adopted that generally, in order to supply the melted resin to the gap 36 uniformly, it is preferable that the two melting members 37 are melted at almost the same speed, and in the embodiment, due to this, by adopting the above-mentioned composition that the two melting member 37 are formed to have almost the same length, the above-mentioned preferable composition "the two melting members 37 are melted at almost the same speed" can be realized by a simple mechanism that the two melting members 37 are pressed simultaneously. Further, in order that the two melting members 37 are pressed simultaneously, for example, they can be pressed by one horn in common.

In the embodiment, the melting members 37 are formed to have a pin shape, but the shape of the melting member 37 is not limited to this, for example, the melting member 37 can be formed to have a plate-like shape. In addition, the shaft parts 37b of the melting member 37 can be formed to have a taper shape that tapers toward the forward end thereof gradually for the purpose that the forward end portion is easily melted.

Next, a method of manufacturing the wire harness 1 will be explained.

When the wire harness 1 is manufactured, first, end portions of the cables 2a to 2c in which the second bonding terminals 9a to 9c are installed are inserted into the cable insertion holes 34 of the first division air-tight block 35a, and the respective cables 2a to 2c are held in the second outer housing 10a in alignment with each other and apart from each other at predetermined intervals by the second inner housing 10b.

After that, the second division air-tight block 35b is welded to the first division air-tight block 35a due to ultrasonic welding, and a pair of the division air-tight blocks 35a, 35b is integrated and simultaneously the cables 2a to 2c are sandwiched between the sandwiching parts 38.

At this time, a horn is brought into contact with the second division air-tight block 35b, the second division air-tight block 35b is vibrated and simultaneously pressed in a side of the first division air-tight block 35a by the horn, and the pair of the division air-tight blocks 35a, 35b is welded, but if the second division air-tight block 35b is excessively pressed in a side of the first division air-tight block 35a at the time of the ultrasonic welding, the sandwiching parts 38 are pressed by the sheath 5, heat is generated at the contact part of the sandwiching parts 38 and the sheath 5, so that the sheath 5 may be melted. Consequently, the embodiment is configured to have a composition that the pressing by the horn is stopped at the time when the sandwiching parts 38 are adhered to the sheath 5 to such an extent that the melted resin is prevented from being leaked.

After the pair of the division air-tight blocks 35a, 35b is integrated due to the ultrasonic welding, the melting member 37 is inserted into the cable insertion hole 34 via the first insertion part 39, the horn is brought into contact with the head part 37a of the melting member 37, and the melting member 37 is vibrated and simultaneously pressed to the first press receiving part 40. At this time, the two melting members 37 are pressed by the horns simultaneously. When a forward end portion of the shaft part 37b of the melting member 37 is brought into contact with the first press receiving part 40, heat is generated between the forward end portion of the shaft part 37b and the first press receiving part 40 so that the forward end portion of the shaft part 37b of the melting member 37 is melted. The melted resin obtained by that the forward end portion of the shaft part 37b of the melting member 37 is melted is poured into the gap 36 formed around the cables 2a to 2c (the gap 36 located between both sandwiching parts 38).

When the melting member 37 is further vibrated and simultaneously pressed, the forward end portion of the shaft part 37b is melted sequentially and is poured into the gap 36, and the gap 36 between both sandwiching parts 38 is perfectly filled with the melted resin. Further, at this time, the head part 37a of the melting member 37 is brought into contact with the a peripheral edge of the first insertion part 39 and the head part 37a is also welded to the air-tight block 35.

When the vibration by the horn is stopped in this state, the melted resin with which peripheries of the cables 2a to 2c is covered is solidified, and the melting member 37 and the cables 2a to 2c are adhered to each other with no space. In addition, by that the melted resin is solidified, the melting member 37 and the air-tight block 35 are integrated. The head part 37a of the melting member 37 protruding from the air-tight block 35 can be scraped or can be left as it stands.

Due to the method mentioned above, an air-tight maintaining structure between the second housing 10 and the cables 2a to 2c is formed, and the wire harness 1 is obtained. Further, since a combination procedure of the first connector part 8 is included in a conventional technique, here, the explanation is omitted.

As explained above, the wire harness 1 of the embodiment is configured to have a composition that the melting member 37 is inserted into the cable insertion hole 34 via the first insertion part 39 and is vibrated and simultaneously pressed to the first press receiving part 40 so that the forward end portion of the melting member 37 that is brought into contact with the first press receiving part 40 is melted, and the melted resin obtained by that the melting member 37 is melted is poured into the gap 36 between the cables 2a to 2c and the air-tight block 35 and peripheries of the cables 2a to 2c are covered with the melted resin so that the air-tightness between the air-tight block 35 and the cables 2a to 2c is maintained.

The melted resin obtained by that the melting member 37 is melted is poured into the gap 36 between the cables 2a to 2c and the air-tight block 35, peripheries of the cables 2a to 2c can be covered with the melted resin with no space and simultaneously the air-tight block 35 that is installed to be air-tight to the second housing 10 and the melting member 37 can be integrated with no space, and an air-tightness between the second housing 10 and the cables 2a to 2c can be sufficiently maintained.

In addition, in the wire harness 1, the melting member 37 is formed to be inserted into a communication part in which the cable insertion holes 34 adjacent to each other are communicated with each other by the first insertion part 39 so as not to press the cables 2a to 2c, so that the air-tightness between the air-tight block 35 and the cables 2a to 2c can be maintained without allowing the sheath 5 of the cables 2a to 2c to be melted.

Figure 9:
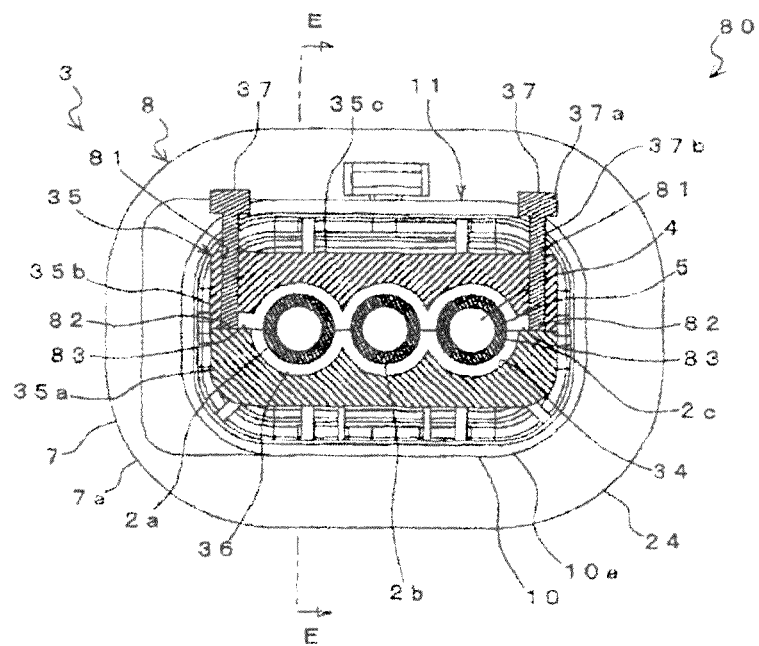
FIG. 9 is a cross-sectional view taken along the line D-D in FIG. 8.
Figure 10:
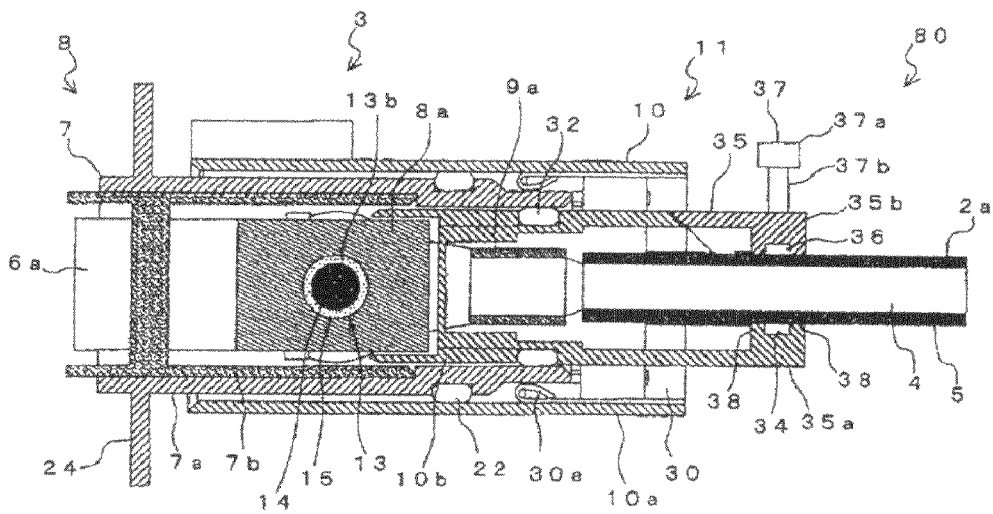
FIG. 10 is a cross-sectional view taken along the line E-E in FIG. 8.
Figure 11A:
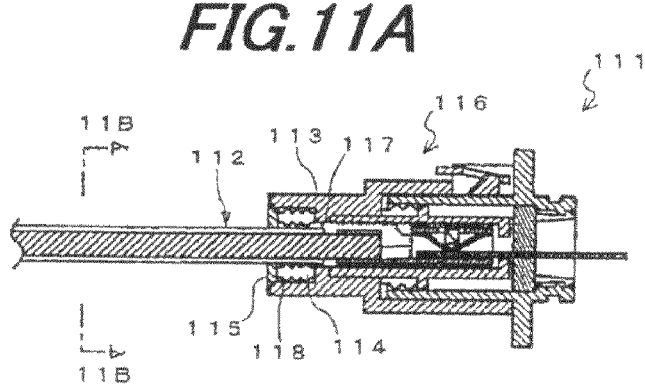
FIG. 11A is a longitudinal cross-sectional view schematically showing a conventional wire harness.
Figure 11B:
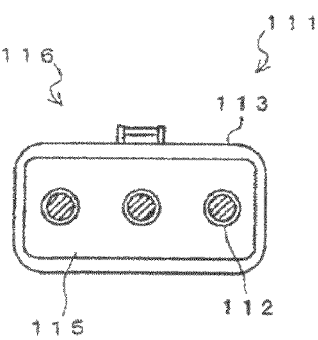
FIG. 11B is a cross-sectional view taken along the line 11B-11B in FIG. 11A.
Figure 12A:
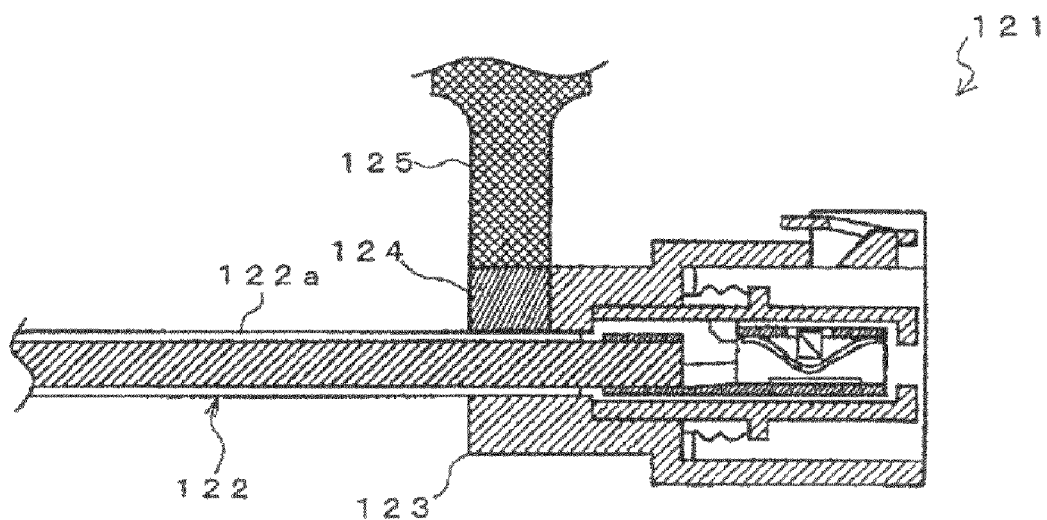
FIG. 12A is a longitudinal cross-sectional view schematically showing a conventional wire harness.
Figure 12B:
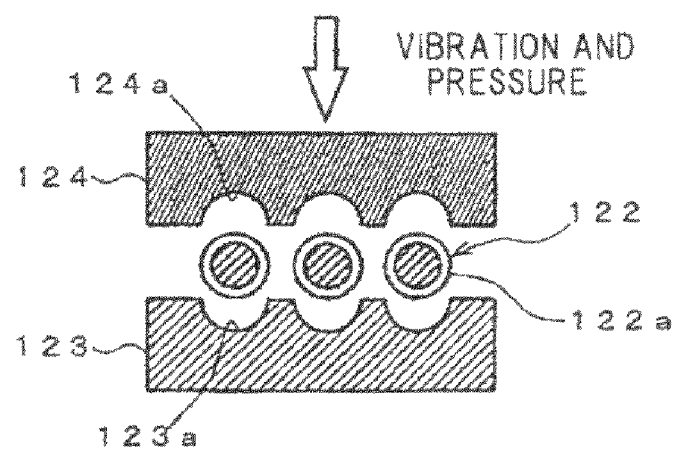
FIG. 12B is an exploded transverse cross-sectional view schematically showing an air-tightness maintaining structure in the conventional wire harness.

In addition, in the wire harness 1, since the cable insertion holes 34 are formed to be communicated with each other so that the cable insertion holes 34 adjacent to each other are stacked on each other (refer to FIGS. 2 and 9), a distance between cables 2a to 2c can be smaller, a pitch of the cables 2a to 2c can be further shortened and it can contribute to size reduction of the wire harness 1.

In addition, in the wire harness 1, the melting member 37 is configured to have a melting temperature lower than the air-tight block 35, so that a problem can be prevented, that the air-tight block 35 is melted when the melting member 37 is melted.

In addition, in the wire harness 1, the sandwiching parts 38 for holding the cables 2a to 2c are formed in the air-tight block 35 so as to sandwich them between the sandwiching parts 38, so that the gap 36 formed on the peripheries of the cables 2a to 2c can be kept to have a predetermined distance, and the melted resin can be surely supplied to the peripheries of the cables 2a to 2c. Namely, generation of a problem that, for example, a part of the cables 2a to 2c is not covered with the melted resin can be prevented.

In addition, in the wire harness 1, the air-tight block 35 is formed to be divided into two pieces so as to be vertically sandwich the cables 2a to 2c arranged in parallel, so that the cables 2a to 2c can be easily inserted into the second housing 10 (the cable insertion hole 34).

Furthermore, in the wire harness 1, two melting members 37 are pressed simultaneously and the two melting members 37 are melt at almost the same speed, so that the melted resin can be uniformly supplied to the gap 36.

Next, another embodiment according to the invention will be explained.

The wire harness 80 shown in FIGS. 8 to 11 has basically the same composition as the wire harness 1 explained in FIGS. 1 to 4, but is different from the wire harness 1 in an inserting position of the melting member 37.

Particularly, in the wire harness 80, the air-tight block 35 includes a second insertion part 81 that is a part into which the melting member 37 is inserted, and is communicated with the cable insertion holes 34 located at both ends of the plurality of cable insertion holes 34 arranged in parallel, and a second press receiving part 82 formed in an inner wall surface of the second insertion part 81 for allowing a forward end of the melting member 37 inserted into the second insertion part 81 to be pressed. Namely, the wire harness 80 is configured to have a composition that the second insertion part 81 and the second press receiving part 82 are formed instead of the first insertion part 39 and the first press receiving part 40 of the wire harness 1.

In the embodiment, in order to prevent the melting member 37 from being brought into contact with the cables 2a to 2c, the second insertion part 81 is formed to be located apart from the cables 2a, 2c arranged in both side along the parallel arrangement direction, at predetermined intervals. Further, a rear end portion 35c of the air-tight block 35 in which the second insertion part 81 is formed is formed to have a flange-like shape expanded in the parallel arrangement direction of the cables 2a to 2c.

The second insertion part 81 is communicated with the gap 36 formed around the cables 2a to 2c via a melted resin introduction hole 83 that is a part of the second insertion part 81. The melted resin introduction hole 83 is formed to have an approximately rectangular shape on a cross-section view, and an inner wall surface of the second insertion part 81, more particularly, an inner wall surface of the melted resin introduction hole 83 forms the second press receiving part 82 against which the melting member 37 is pressed.

In accordance with the wire harness 80, similarly to the wire harness 1, the melted resin obtained by that the melting member 37 is melted can be poured into the gap 36 between the cables 2a to 2c and the air-tight block 35 and the air-tightness between the air-tight block 35 and the cables 2a to 2c can be maintained without allowing the sheath 5 of the cables 2a to 2c to be melted.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

For example, a case that only the first insertion part 39 and the first press receiving part 40 are formed in the wire harness 1, and a case that only the second insertion part 81 and the second press receiving part 82 are formed in the wire harness 80 have been explained, but naturally, both of the first insertion part 39 and the first press receiving part 40, and the second insertion part 81 and the second press receiving part 82 can be formed.

In addition, in the above-mentioned embodiment, the air-tight block 35 is formed to be a part of the second inner housing 10b, but not limited to this, the air-tight block 35 can be also formed to be a part of the second outer housing 10a, and further, a composition that the air-tight block 35 is formed separately from the second housing 10 and the air-tight block 35 formed separately is formed to be air-tight to the second housing 10 can also be adopted.

In addition, the above-mentioned embodiment is configured to have a composition that when the second division air-tight block 35b is welded to the first division air-tight block 35a due to the ultrasonic welding, the pressing by the horn is stopped at the time when the air-tight block 35 is adhered to the sheath 5 of the cables 2a to 2c at the sandwiching parts 38 to such an extent that the melted resin is prevented from being leaked, but not limited to this, a composition can be also adopted, that in order to perfectly prevent the sheath 5 from being melted, a protection member that is formed of a metal or a resin having a melting temperature higher than the air-tight block 35 is formed in a periphery of the sheath 5 located at a position to be held by the sandwiching parts 38, so that the air-tight block 35 and the sheath 5 are prevented from being directly brought into contact with each other.

In addition, the above-mentioned embodiment is configured to have a composition that the vibration and pressure of the melting member 37 by the horn is stopped at the time when the gap between the both sandwiching parts 38 is perfectly filled with the melted resin, but not limited to this, a composition can be also adopted, that after the gap between the both sandwiching parts 38 is perfectly filled with the melted resin, the melting member 37 is further vibrated and simultaneously pressed by the horn so as to be melted, so that an inner pressure of the melted resin filled in the gap 36 is heightened and the sheath 5 of the cables 2a to 2c is pressed by the melted resin filled in the gap 36 (poured into the gap 36). Due to this, the air-tightness can be further enhanced.

In addition, the above-mentioned embodiment is configured to have a composition that two sandwiching parts 38 are formed and the melted resin is poured into the gap 36 formed between both the two sandwiching parts 38, but not limited to this, a composition that one sandwiching part 38 can be formed or the sandwiching part 38 can be also omitted can be also adopted.

In case that one sandwiching part 38 is formed, it is preferable that the sandwiching part 38 is formed in an end portion of the air-tight block 35 in the insertion side of the cables 2a to 2c, so that the cables 2a to 2c are held by the sandwiching part 38 so as to keep the gap 36, and simultaneously the melted resin is prevented from being leaked to the outside of the air-tight block 35 when the melting member 37 is melted. In this case, since the melted resin pours into sides of the second bonding terminals 9a to 9c, it can not be carried out that an inner pressure of the melted resin is heightened and the sheath 5 is pressed, but the air-tightness between the cables 2a to 2c and the air-tight block 35 can be sufficiently maintained.

In addition, in case that the sandwiching part 38 is omitted, a composition can be adopted, that the cables 2a to 2c are supported by a supporting member located exteriorly so as to keep the gap, and when the melting member 37 is melted, the vibration and pressure of the melting member 37 by the horn is stopped at the time when the melted resin overflows the cable insertion hole 34. In this case, since the melting member 37 is leaked to the outside of the air-tight block 35, an appearance is somewhat degraded, but the air-tightness between the cables 2a to 2c and the air-tight block 35 can be sufficiently maintained. Additionally, in case that the sandwiching part 38 is omitted, since the cables 2a to 2c can be easily inserted into the cable insertion hole 34, there is no need to form the air-tight block 35 to be divided, but needless to say, the air-tight block 35 can be also formed to be divided, if it is more advantageous in manufacturing that the air-tight block 35 is formed to be divided.

In addition, the above-mentioned embodiment is configured to have a composition that the melting member 37 has a melting temperature lower than the air-tight block 35, but not limited to this, a composition can be also adopted, that the melting member 37 and the air-tight block 35 are formed of the same material with each other or formed of materials of which melting temperatures are close to each other, and a metal member or a poorly-fusible resin member formed of a resin having a melting temperature higher than the melting member 37 is installed in the press receiving parts (the first press receiving part 40 and/or second press receiving part 82) to which the melting member 37 is pressed, so that the air-tight block 35 is prevented from being melted. In particular, the melting member 37 and the air-tight block 35 are formed of the same material with each other, so that when the melted resin is solidified, the melting member 37 and the air-tight block 35 can be further firmly integrated with each other, and the air-tightness can be further enhanced.

In the above-mentioned embodiment, a case that the gap 36 is perfectly filled with the melted resin has been explained, but the invention is not limited to this, a case that the gap 36 is not perfectly filled with the melted resin and there is somewhat space can be also included in the scope of the technical idea of the invention.

In addition, in the above-mentioned embodiment, an air-tightness maintaining structure between the second housing 10 in the second connector part 11 and the cables 2a to 2c has been explained, but the invention is not limited to this, in case that the cables 2a to 2c are connected to the first connector part 8, the invention can be also applied to an air-tightness maintaining structure between the first housing 7 in the first connector part 8 and the cables 2a to 2c.

In addition, in the above-mentioned embodiment, the central conductor 4 in the cables 2a to 2c is formed to have an approximately circular shape on a cross-section view, but not limited to this, the invention can be also applied to the central conductor 4 in the cables 2a to 2c formed to have another shape, such as a rectangular shape.

Finally, as a supplemental description, in the above-mentioned embodiment, with regard to both of the ultrasonic welding work for integrating a pair of the division air-tight blocks 35a, 35b and the ultrasonic welding work for filling the melted resin of the melting member 37 into the gap 36 of the air-tight block 35, the horn can be configured to be moved in one direction (FIG. 2 shows as downward from above). Due to this, a remarkable and advantageous effect that the manufacturing is easily carried out can be provided.

What is claimed is:

1. A wire harness, comprising:
a plurality of cables arranged in parallel; and
a connector comprising a housing to which end portions of the plurality of cables are connected,
wherein the housing comprises an air-tight block at a side thereof that the plurality of cables are connected, the air-tight block comprising a plurality of cable insertion holes formed in parallel through which the plurality of cables are inserted into the housing,
wherein the cable insertion holes are formed to have a gap with a predetermined distance between the cables and the air-tight block, two adjacent ones of the cable insertion holes being formed to overlap with each other and to communicate with each other,
wherein the air-tight block further comprises a first insertion part into which a melting member formed of a resin is inserted and which allows the melting member to be inserted into a part that two adjacent ones of the cable insertion holes communicate with each other without pressing the cables, and a first press receiving part formed at an inner wall surface of the cable insertion holes opposite the first insertion part, for allowing a front end of the melting member inserted into the cable insertion holes through the first insertion part to be pressed against the first press receiving part, and
wherein air-tightness between the air-tight block and the cables is maintained by inserting the melting member into the cable insertion holes through the first insertion part, vibrating the melting member and pressing the melting member against the first press receiving part such that the front end portion of the melting member in contact with the first press receiving part is melted into a melt resin to allow the melt resin to be poured into the gap and a periphery of the cables to be covered with the melt resin.

2. The wire harness according to claim 1, wherein the air-tight block further comprises a second insertion part into which the melting member is inserted, and which communicates with two at both ends of the plurality of cable insertion holes arranged in parallel, and a second press receiving part formed at an inner wall surface of the second insertion part, for pressing a forward end of the melting member inserted into the second insertion part, and
wherein a forward end portion of the melting member in contact with the second press receiving part is melted into a melt resin by inserting the melting member into the second insertion part, vibrating the melting member and pressing the melting member against the second press receiving part such that the melt resin is poured into the gap.

3. A wire harness, comprising:
a plurality of cables arranged in parallel; and
a connector comprising a housing to which end portions of the plurality of cables are connected, wherein the housing comprises an air-tight block at a side thereof that the plurality of cables are connected, the air-tight block comprising a plurality of cable insertion holes formed in parallel through which the plurality of cables are inserted into the housing, wherein the cable insertion holes are formed to have a gap with a predetermined distance between the cables and the air-tight block, two adjacent ones of the cable insertion holes being formed to overlap with each other and to communicate with each other, wherein the air-tight block further comprises a second an insertion part into which a melting member formed of a resin is inserted and which communicates with two at both ends of the cable insertion holes arranged in parallel, and a second press receiving part formed at an inner wall surface of the insertion part, for allowing a front end of the melting member inserted into the insertion part to be pressed against the second press receiving part, and wherein air-tightness between the air-tight block and the cables is maintained by inserting the melting member into another insertion part, vibrating the melting member and pressing the melting member against the second press receiving part such that the front end portion of the melting member in contact with the second press receiving part is melted into a melt resin to allow the melt resin to be poured into the gap and a periphery of the cables to be covered with the melt resin.

4. The wire harness according to claim 1, wherein the air-tight block is formed of a resin, and the melting member has a melting temperature lower than the air-tight block.

5. The wire harness according to claim 1, wherein the air-tight block is formed of a resin, the melting member and the air-tight block are formed of a material equal to each other or materials of which melting temperatures are close to each other, and a metal member or a high melting point member formed of a resin of which a melting temperature is higher than the melting member is installed in the press receiving parts against which the melting member is pressed.

6. The wire harness according to claim 1, wherein the air-tight block further comprises a sandwiching part for sandwiching the cables so as to keep the gap formed on the periphery of the cables to have a predetermined distance.

7. The wire harness according to claim 6, wherein the two sandwiching parts are formed in a longitudinal direction of the cables and the melt resin is poured into the gap between the two sandwiching parts, and after the gap between both of the sandwiching parts is perfectly filled with the melt resin, the melting member is further pressed and melted such that the cables are pressed by the melt resin pouring into the gap between the two sandwiching parts.

8. The wire harness according to claim 1, wherein the air-tight block is formed of a pair of division air-tight blocks that is formed of a resin, and is divided into two pieces so as to vertically sandwich the plurality of cables arranged in parallel, and on the condition that the plurality of cables are sandwiched between the pair of division air-tight blocks, the pair of division air-tight blocks is welded by ultrasonic welding so as to be integrated.

9. The wire harness according to claim 1, wherein a plurality of the insertion parts and a plurality of the press receiving parts are formed in a longitudinal direction of the cables and the melting member is inserted into the plurality of insertion parts, respectively, and a plurality of the melting members inserted into the plurality of insertion parts are pressed simultaneously.

10. A method of manufacturing a wire harness comprising a plurality of cables arranged in parallel and a connector comprising a housing to which end portions of the plurality of cables are connected, wherein the housing comprises an air-tight block at a side thereof that the plurality of cables are connected, the air-tight block comprising a plurality of cable insertion holes formed in parallel through which the plurality of cables are inserted into the housing, wherein the cable insertion holes are formed to have a gap with a predetermined distance between the cables and the air-tight block, two adjacent ones of the cable insertion holes being formed to overlap with each other and to communicate with each other, and wherein the air-tight block further comprises a first insertion part into which a melting member formed of a resin is inserted and which allows the melting member to be inserted into a part that two adjacent ones of the cable insertion holes communicate with each other without pressing the cables, and a first press receiving part formed at an inner wall surface of the cable insertion holes opposite the first insertion part, for allowing a front end of the melting member inserted into the cable insertion holes through the first insertion part to be pressed against the first press receiving part, the method comprising:

inserting the melting member into the cable insertion holes through the first insertion part; and vibrating the melting member and pressing the melting member against the first press receiving part such that the front end portion of the melting member in contact with the first press receiving part is melted into a melt resin to allow the melt resin to be poured into the gap and a periphery of the cables to be covered with the melt resin in order to maintain air-tightness between the air-tight block and the cables.

11. A method of manufacturing a wire harness comprising a plurality of cables arranged in parallel and a connector comprising a housing to which end portions of the plurality of cables are connected, wherein the housing comprises an air-tight block at a side thereof that the plurality of cables are connected, the air-tight block comprising a plurality of cable insertion holes formed in parallel through which the plurality of cables are inserted into the housing, wherein the cable insertion holes are formed to have a gap with a predetermined distance between the cables and the air-tight block, two adjacent ones of the cable insertion holes being formed to overlap with each other and to communicate with each other, and wherein the air-tight block further comprises an insertion part into which a melting member formed of a resin is inserted and which communicates with two at both ends of the cable insertion holes arranged in parallel, and a second press receiving part formed at an inner wall surface of the insertion part, for allowing a front end of the melting member inserted into the insertion part to be pressed against the second press receiving part, the method comprising:

inserting the melting member into another insertion part; and vibrating the melting member and pressing the melting member against the second press receiving part such that the front end portion of the melting member in contact with the second press receiving part is melted into a melt resin to allow the melt resin to be poured into the gap and a periphery of the cables to be covered with the melt resin in order to maintain air-tightness between the air-tight block and the cables.

* * * * *